(12) United States Patent
Zeng et al.

(10) Patent No.: US 6,891,426 B2
(45) Date of Patent: May 10, 2005

(54) CIRCUIT FOR PROVIDING MULTIPLE VOLTAGE SIGNALS

(75) Inventors: Raymond Zeng, Folsom, CA (US); Binh N. Ngo, Folsom, CA (US)

(73) Assignee: Intel Corporation, Hillsboro, OR (US)

( * ) Notice: Subject to any disclaimer, the term of this patent is extended or adjusted under 35 U.S.C. 154(b) by 392 days.

(21) Appl. No.: 10/056,657

(22) Filed: Oct. 19, 2001

(65) Prior Publication Data

US 2003/0174013 A1 Sep. 18, 2003

(51) Int. Cl.[7] .................................................. G05F 1/10
(52) U.S. Cl. ....................... 327/536; 327/534; 327/540; 327/415; 327/416
(58) Field of Search ................................. 327/415, 416, 327/434, 534, 536, 537, 540, 541; 323/316

(56) References Cited

U.S. PATENT DOCUMENTS 5,034,625 A * 7/1991 Min et al. .................... 327/536
5,337,284 A * 8/1994 Cordoba et al. ............. 365/227
5,434,820 A * 7/1995 Kim ....................... 365/189.09
5,561,385 A * 10/1996 Choi .......................... 327/536
5,808,954 A * 9/1998 Ichikawa .................... 365/226
5,982,222 A * 11/1999 Kyung ....................... 327/536
6,031,411 A * 2/2000 Tsay et al. .................. 327/536
6,144,606 A * 11/2000 Pan ............................ 365/226
6,246,280 B1 * 6/2001 Morishita ................... 327/535
6,285,622 B1 * 9/2001 Haraguchi et al. .......... 365/226
6,339,547 B1 * 1/2002 Roohparvar ........... 365/185.18
6,356,488 B1 * 3/2002 Kang .................... 365/189.09
6,388,506 B1 * 5/2002 Voo ............................ 327/536

* cited by examiner

Primary Examiner—Terry D. Cunningham
(74) Attorney, Agent, or Firm—Fish & Richardson P.C.

(57) ABSTRACT

A method of providing multiple voltage outputs includes receiving an input signal from a multifunctional pump. The method also includes sending a first output signal based on the input signal using a first switch and sending a second output signal based on the input signal using a second switch and a transistor.

14 Claims, 3 Drawing Sheets

CIRCUIT FOR PROVIDING MULTIPLE VOLTAGE SIGNALS

TECHNICAL FIELD

This invention relates to providing regulated voltages to an external circuit.

BACKGROUND

A voltage pump is used to provide voltage to an external circuit. Voltage pumps have a single function, such as a read pump, a program/erase pump or a standby pump. The read pump provides a required voltage to the external circuit so that data can be read. A program/erase pump provides the required voltage to store or to erase data. A standby pump maintains a minimum voltage until other commands (e.g., program/erase, read) are received.

DESCRIPTION

Figure 1:
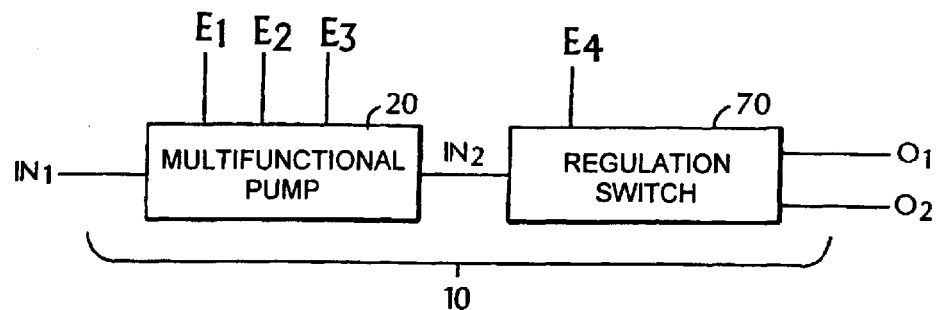
FIG. 1 is a block diagram of a multifunctional pump system.

Referring to FIG. 1, a multifunctional pump system 10 includes a multifunctional pump 20 and a regulation switch 70. Multifunctional pump 20 functions as a program/erase pump, a standby pump, and a read pump. When multifunctional pump 20 functions as a program/erase pump, the multifunctional pump is in a program mode or in an erase mode. When multifunctional pump 20 functions as a standby pump, pump 20 is in a standby mode. When multifunctional pump 20 functions as a read pump, pump 20 is in a read mode.

As described in more detail below, multifunctional pump 20 receives an input signal, $IN_1$, and if enabled by one, two or three enabling signals, $E_1$, $E_2$, and $E_3$ (FIG. 2), the pump produces a corresponding output voltage, $IN_2$, which represents a read pump, standby pump or a program/erase pump depending on the enabling signals received.

For multifunctional pump system 10 to function properly, the system provides multiple outputs and multiple voltage levels to satisfy requirements of an external circuit (not shown). For example, when multifunctional pump 20 is in the program mode, multifunctional pump 20 slews from a read level voltage (e.g., 5 volts (V)) to a program level voltage (e.g., 7 V) and back down to a verify level voltage (e.g., 5 V); and system 10 provides an output corresponding to these voltage changes. Another output is required from system 10 that provides a constant voltage (e.g., 5 V). Thus, system 10 provides both a variable voltage level signal and a constant voltage.

In order to meet these requirements in a multifunctional pump system 10, a regulation switch 70 is added to regulate an output, $IN_2$, of multifunctional pump 20 and to produce two outputs. Multifunctional pump 20 supplies $IN_2$, as input to regulation switch 70 and the regulation switch produces a first output signal, $O_1$, and second output signal, $O_2$. First output signal, $O_1$, is the program/erase pump voltage and second output voltage, $O_2$, is a standby/read voltage.

Figure 2:
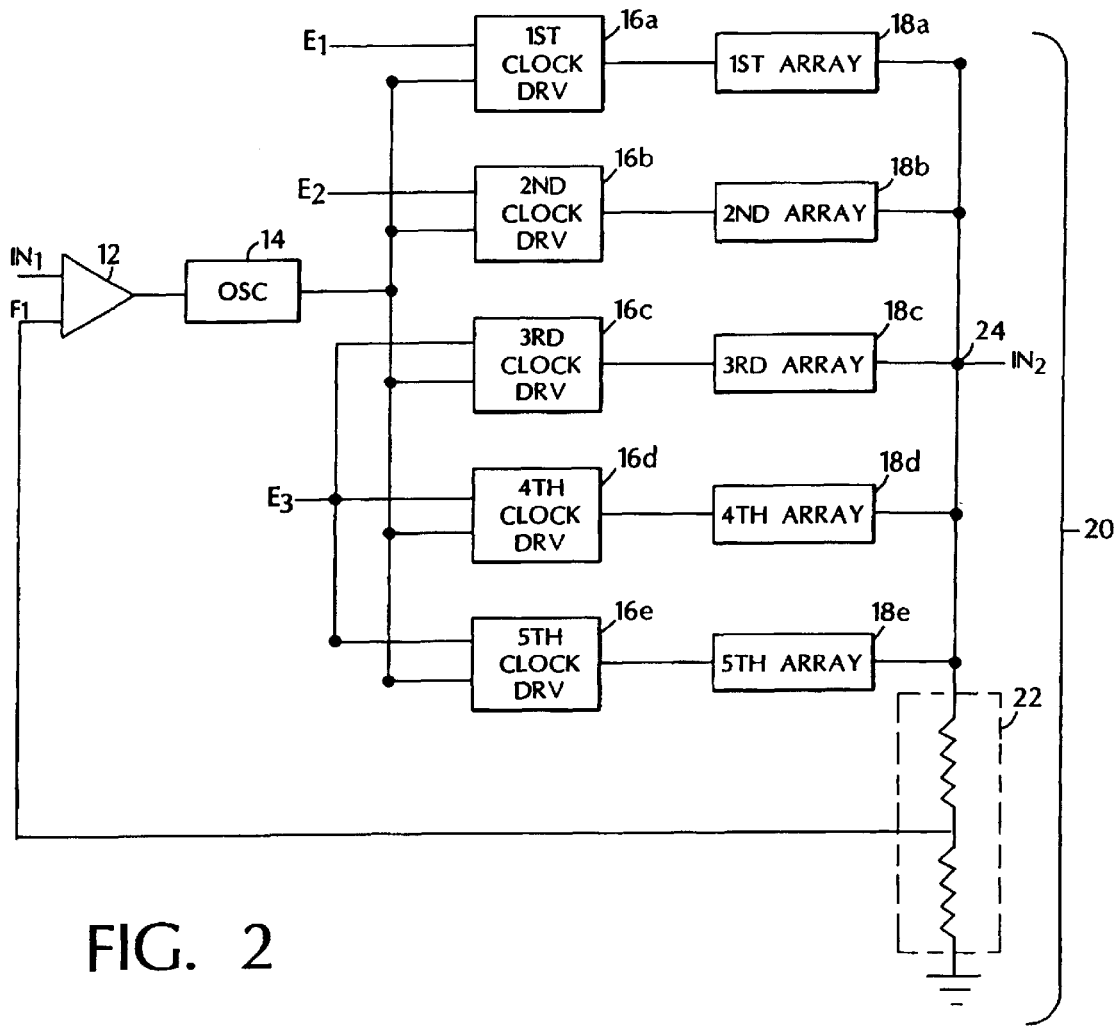
FIG. 2 is a circuit diagram of a multifunctional pump.

Referring to FIG. 2, multifunctional pump 20 includes a comparator 12, an oscillator 14, clock drivers (e.g., first clock driver 16a, second clock driver 16b, third clock driver 16c, fourth clock driver 16d, and fifth clock driver 16e), arrays (e.g., first array 18a, second array 18b, third array 18c, fourth array 18d, and fifth array 18e), and a feedback network 22. Each array is a circuit array that includes switches, capacitors, and transistors configured similar to any standard voltage pump configuration. Comparator 12 receives input, $IN_1$, and compares $IN_1$ to a feedback signal $F_1$. If feedback signal $F_1$ is less than input signal $IN_1$, then comparator 12 turns-on oscillator 14. Oscillator 14 then supplies an oscillating signal to each of the clock drivers 16a–e. When activated, each of the clock drivers 16a–e supply a signal to a corresponding array 18a–e. The output from each array 18a–e are connected to a node 24 so that an output signal, $IN_2$, is measured from node 24. In this embodiment, oscillator 14 is a four phase clock.

Enable signals (e.g., first enable signal $E_1$, second enable $E_2$, and third enable signal $E_3$) activate corresponding clock drivers to place multifunctional pump 20 in different modes. For instance, multifunctional pump 20 is in the standby mode when first enable signal, $E_1$, enables clock driver 16a and turns-on first array 18a. Multifunctional pump 20 is in the read mode if first array 18a is already turned-on and second enable signal, $E_2$, enables second clock driver 16b to turn-on second array 18b. Multifunctional pump 20 is in the program mode, if first array 18a and second array 18b are already turned-on and third enable signal, $E_3$, enables third clock driver 16a, fourth clock driver 16b, fifth clock driver 16e simultaneously to correspondingly activate third array 18c, fourth array 18d, and fifth array 18e.

Feedback circuit 22 connects to node 24 and supplies feedback signal, $F_1$, from arrays 18a–e to comparator 12. In this embodiment, feedback circuit 22 is made of resistive elements. In other embodiments, feedback circuit 22 can have resistive elements that include transistors configured as a voltage divider.

In single function pumps, a standby pump uses one array, a read pump uses two arrays, and a program/erase pump uses five arrays. In this embodiment, multifunctional pump 20 uses only five arrays. Multifunctional pump 20 saves approximately 45% of the die size area than if there were three separate pumps. For instance, the read pump occupies about 0.164 square millimeters (mm), a standby pump occupies 0.109 square mm, and a program pump occupies 0.329 square mm. By combining all three functions and using only five arrays, multifunctional pump 20 occupies only 0.329 square mm which is equal to the size of a program pump.

In this embodiment, during standby mode and read mode, $IN_2$ is equal to 4.8 V. During program mode $IN_2$ is equal to 7.0 V and during erase mode, $IN_2$ is equal to 5.0 V.

Figure 3:
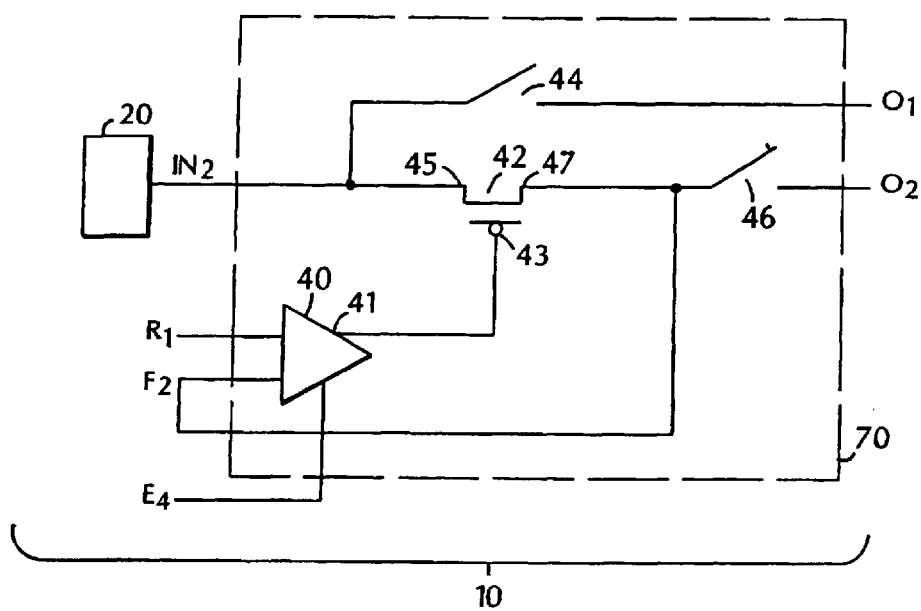
FIG. 3 is a higher level circuit diagram schematic of a voltage regulation switch.

Regulation switch 70 as shown in FIG. 3 includes a comparator 40, a first transistor 42 (e.g., p-channel metal oxide semiconductor), a first switch 44, and a second switch 46. Comparator 40 receives a feedback voltage, $F_2$, and compares it to a reference voltage, $R_1$, when enabled by a fourth enable signal, $E_4$. Feedback voltage $F_2$, connects a transistor source 45 to comparator 40. If $F_2$ is less than $R_1$, comparator 40 regulates a gate 43 of first transistor 42. First transistor 42 acts as a series regulation switch. Thus, transistor 42 is turned-on when the voltage of transistor gate 43 drops below a threshold voltage, $V_T$, of transistor 42. However, as the voltage increases from comparator 40 to transistor gate 43, the first transistor 42 gradually turns-off so that the transistor is off when the voltage at transistor gate 43 is greater than $IN_2-V_T$. For example, when $IN_2=4.8$ V and $V_T=0.7$ V, transistor 42 turns off at gate voltages greater than 4.1 volts.

In this embodiment, first switch 44 is a back-to-back switch which includes logic circuits (e.g., AND gates) and a complimentary metal oxide semiconductor transistor. Second switch 46 includes a p-channel metal oxide semiconductor transistor.

Figure 4:
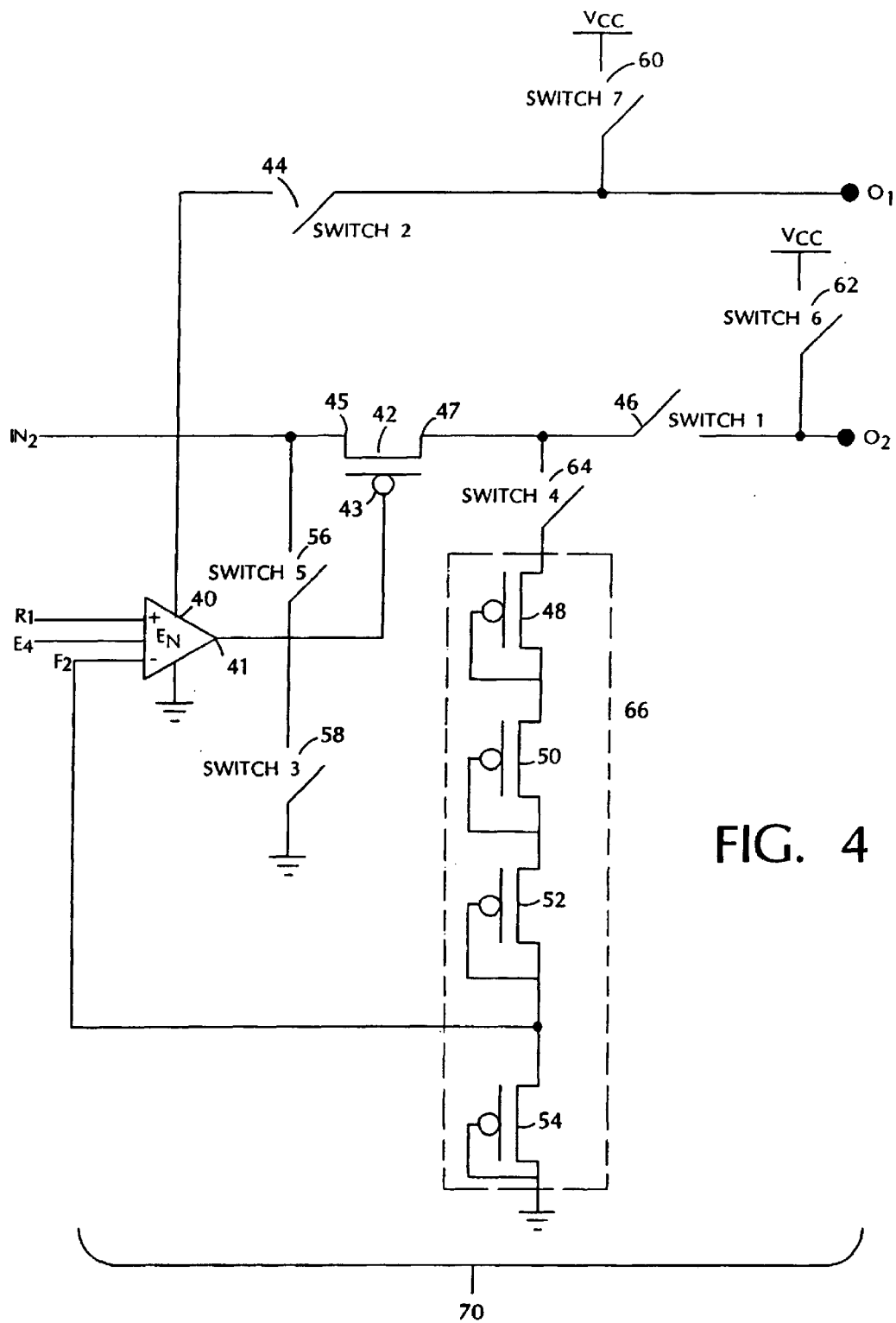
FIG. 4 is a circuit level diagram of another embodiment of the voltage regulation switch.

Referring to FIG. 4, in other embodiments, regulation switch 70 includes a set of additional switches (a third switch 58, a fourth switch 64, a fifth switch 56, a sixth switch 62, and a seventh switch 60) and a feedback system 66.

Multifunctional pump 20 is turned-off when first switch 46, second switch 44, third switch 58 and fourth switch 64 are open or off and fifth switch 56, sixth switch 62 and seventh switch 60 are closed or on. With fifth switch closed and third switch open, first transistor 42 is off since the transistor gate is tied to the transistor drain. When multifunctional pump 20 is turned off, first output signal, $O_1$, and second output signal, $O_2$, are both equal to a constant voltage, $V_{CC}$. The following table summarizes, the switch and signals in the no pump mode:

| | |
|---|---|
| Switch 1 | Off |
| Switch 2 | Off |
| Switch 3 | Off |
| Switch 4 | Off |
| Switch 5 | On |
| Switch 6 | On |
| Switch 7 | On |
| Enable signal, $E_4$ | X |
| First output signal, $O_1$ | $V_{CC}$ |
| Second output signal, $O_2$ | $V_{CC}$ |

In the standby mode and read modes, first switch 46 and third switch 58 are closed and the remaining switches are open. Fourth enable signal, $E_4$, disables comparator 40. When the third switch 58 is on, output 41 of comparator 40 is shorted to ground and when fifth switch 56 is opened transistor 40 is fully-on. Therefore, second output signal $O_2$ is equal to 4.8 V and output signal $O_1$, with seventh switch 60 closed, is equal to $V_{CC}$. The following table summarizes, the switch and signals in the standby/read mode:

| | |
|---|---|
| Switch 1 | On |
| Switch 2 | Off |
| Switch 3 | On |
| Switch 4 | Off |
| Switch 5 | Off |
| Switch 6 | Off |
| Switch 7 | Off |
| Enable signal, $E_4$ | Low |
| First output signal, $O_1$ | $V_{CC}$ |
| Second output signal, $O_2$ | 4.8 V |

During a program/erase mode first switch 46, second switch 44 and fourth switch 64 are closed and the remaining switches are open. Fourth enable signal $E_4$ is high and activates comparator 40. Thus, output voltage $O_1$ is directly connected to $IN_2$ and is equal to either 5 V or 7 V and $O_2$ is equal to a constant voltage of 4.7 V. The following table summarizes, the switch and signals in the program/erase mode:

| | |
|---|---|
| Switch 1 | On |
| Switch 2 | On |
| Switch 3 | Off |
| Switch 4 | On |
| Switch 5 | Off |
| Switch 6 | Off |
| Switch 7 | Off |
| Enable signal, $E_4$ | High |
| First output signal, $O_1$ | 7.0 V/5.0 V |
| Second output signal, $O_2$ | 4.7 V |

A feedback circuit 66 includes a second transistor 48, a third transistor 50, a fourth transistor 52 and a fifth transistor 54. Each transistor gate is tied to the transistor drain so that feedback circuit 66 is a voltage divider. The voltage divider allows for feedback voltage $F_2$ to be a lower voltage than the $IN_2$. However, the amount of transistors in feedback circuit 66 is dependent on the reference voltage $R_1$ chosen. In this embodiment, the reference voltage is 1.33 V so that there are four transistors used in feedback circuit 66.

The invention is not limited to the specific embodiments described herein. For example, multifunctional pump system 10 could be designed for other voltages level outputs.

Other embodiments not described herein are also within the scope of the following claims.

What is claimed is:

1. A method of providing multiple voltage outputs, comprising:
   receiving an input signal from a multifunctional pump configured to provide more than two voltage levels, the multifunctional pump comprising:
     clock drivers including a first clock driver, a second clock driver, a third clock driver, a fourth clock driver and a fifth clock driver; and
     array including a first array, a second array, a third array, a fourth array and a fifth array, each array configured to receive input from one corresponding clock driver, each array and corresponding clock driver being in a parallel circuit to the other arrays and corresponding clock drivers, each array comprising a circuit array configured to form a voltage pump, the input signal comprising an array output signal from at least one array;
   sending a first output signal based on the input signal using a first switch;
   sending the input signal to a transistor;
   sending a second output signal received from the transistor via a second switch; and
   comparing a reference voltage and a feedback voltage, received from the transistor, using a first comparator to provide a comparator result, the first comparator being coupled to a gate of the transistor to control the transistor based on the comparator result.

2. The method of claim 1, wherein the first output signal has a voltage level of 7 volts and a voltage level of 5 volts and the second output signal is 5 volts.

3. The method of claim 1, wherein the multifunctional pump further comprises:
   an oscillator providing a clock signal to each of the clock drivers; and
   a second comparator providing input to the oscillator, the second comparator comparing the output from the arrays with a predetermined voltage.

4. The method of claim 3, further comprising:

placing the multifunctional pump in a standby mode when the first clock driver is enabled by a first signal.

5. The method of claim 3, further comprising:

placing the multifunctional pump in a read mode when the second clock driver is enabled by a second signal and the first array is on.

6. The method of claim 3, further comprising:

placing the multifunctional pump in a program mode when the third clock driver, the fourth clock driver, and the fifth clock driver are enabled by a third signal and the first array and the second array are on.

7. The method of claim 3, further comprising:

placing the multifunctional pump in an erase mode when the third clock driver, the fourth clock driver, and the fifth clock driver are enabled by a third signal and the first array and the second array are on.

8. An apparatus for providing multiple voltages, comprising:

a multifunctional pump configured to provide more than two voltage level, the multifunctional pump comprising:

clock drivers including a first clock driver, a second clock driver, a third clock driver, a fourth clock driver and a fifth clock driver; and arrays including a first array, a second array, a third array, a fourth array and a fifth array, each array configured to receive input from one corresponding clock driver, each array and corresponding clock driver being in a parallel circuit to the other arrays and corresponding clock drivers, each array comprising a circuit array configured to form a voltage pump;

a first switch receiving input from the multifunctional pump and providing a first output signal;

a transistor receiving input from the multifunctional pump;

a first comparator coupled to a gate of the transistor to control the transistor based on a comparator result, the first comparator comparing a reference voltage and a feedback voltage, received from the transistor, to provide the comparator result; and a second switch, coupled to the transistor, providing a second output signal.

9. The apparatus of claim 8, wherein the first output signal has a voltage level of 7 volts and a voltage level of 5 volts and the second output signal is 5 volts.

10. The apparatus of claim 8, wherein the multifunctional pump further comprises:

an oscillator providing a clock signal to each of the clock drivers; and a second comparator providing input to the oscillator, the second comparator comparing the output from the arrays with a predetermined voltage.

11. The apparatus of claim 10, wherein the multifunctional pump is in standby mode when the first clock driver is enabled by a first signal.

12. The apparatus of claim 10, wherein the multifunctional pump is in read mode when the second clock driver is enabled by a second signal and the first array is on.

13. The apparatus of claim 10, wherein the multifunctional pump is in a program mode when the third clock driver, the fourth clock driver, and the fifth clock driver are enabled by a third signal and the first array and the second array are on.

14. The apparatus of claim 10, wherein the multifunctional pump is in an erase mode when the third clock driver, the fourth clock driver, and the fifth clock driver are enabled by a third signal and the first array and the second array are on.

* * * * *